April 22, 1958 M. PAVESI 2,831,564
DEVICE FOR ARRANGING BISCUITS
Filed April 15, 1957 2 Sheets-Sheet 1

INVENTOR.
Mario Pavesi
BY
Stevens, Davis, Miller & Mosher
his attorneys

April 22, 1958     M. PAVESI     2,831,564
DEVICE FOR ARRANGING BISCUITS
Filed April 15, 1957     2 Sheets-Sheet 2
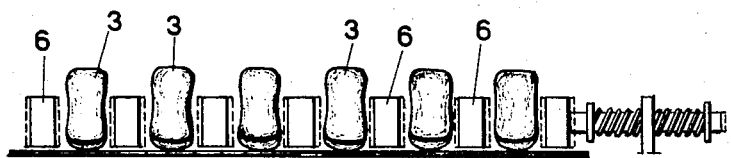
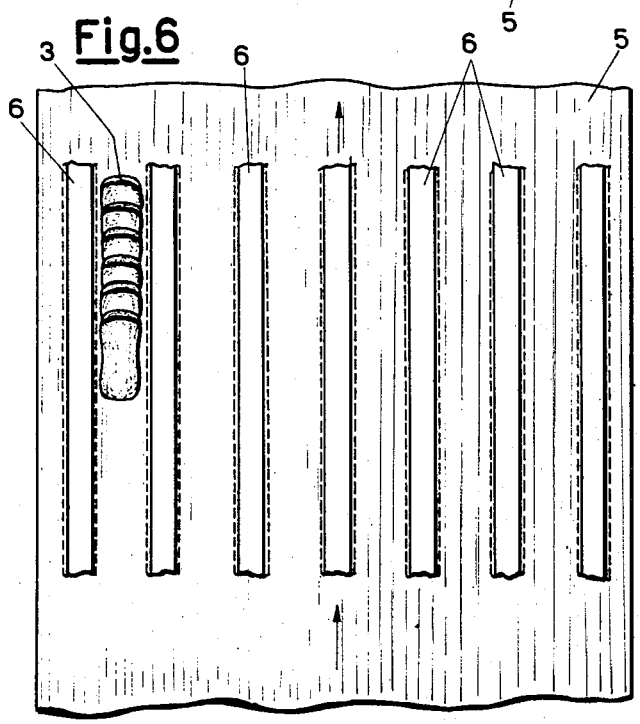
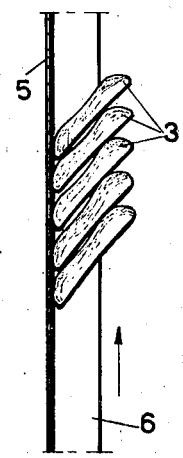
INVENTOR.
Mario Paresi
BY United States Patent Office 2,831,564
Patented Apr. 22, 1958

2,831,564

DEVICE FOR ARRANGING BISCUITS

Mario Pavesi, Novara, Italy, assignor to Pavesi Biscottini di Novara S. p. A., Novara, Italy, an Italian company Application April 15, 1957, Serial No. 652,822

3 Claims. (Cl. 198—30)

In the cycle of operations or stages for making biscuits, the biscuits having approximately elongated shape with substantially flat and convex opposite faces, as is known, when leaving the drying apparatus are made to rest on a transport plane, which conveys them, on analogous faces in order to enable to align them with one sense to facilitate gripping them to place them into the cases orderly so as to avoid empty spaces between said biscuits.

It is an object of the present invention to enable to carry out the operations of arranging the biscuits to rest with analogous faces automatically by means of a device which taking into account the particular shape of the biscuits as outlined above places them firstly all resting flat and subsequently to turn them upside down and to align them, that is to make them rest on their convex faces so as to enable easily to grip them for putting them into cases.

It is in fact an object of the present invention to provide a device for arranging biscuits having nearly elongated shape with substantially flat and convex opposite faces respectively, to rest by analogous faces (i. e. by their flat faces) on a conveyor plane that conveys them and to subsequently tilt them with respect to their former position, characterized in that it comprises essentially a plurality of guides supported fixedly almost adherent above and in the direction of feed of the transporting plane, between which guides the latter brings the biscuits placed at random and deflected in direction at least in one point of their length in such way that the biscuits lying flat abut thereagainst and follow their direction with their resting position while the biscuits placed in opposite position, that is, resting on their convex side, are compelled to erect and to overturn laterally so as to come to lie flat; said guides being provided, at the end of the transporting plane, almost at the same height of said transporting plane, with a lateral projection constituting a partial bottom whereonto by said transporting plane the biscuits are pushed, which after having abandoned the aforesaid transporting plane fall laterally and by effect of their own weight rotated by at least little more than 90° with respect to the vertical and collected by a lower transporting plane at convenient level and with equal feed sense with respect to the upper one, whereon they come to be placed overturned with respect to the (flat) previous resting position.

In order to make the invention more fully clear, reference will be made hereinafter to a preferred embodiment thereof as illustrated diagrammatically, merely by way of example, in the accompanying drawings wherein.

When leaving the drying apparatus, the biscuits in question having elongated shape with substantially flat and respectively convex opposite faces, are spaced by means of a convenient movement of vibration or conveniently distributed at random on a transporting belt 1 which introduces them between the guides 2 supported fixedly almost adherent above and in the direction of feed of said transporting belt 1.

Figure 1:
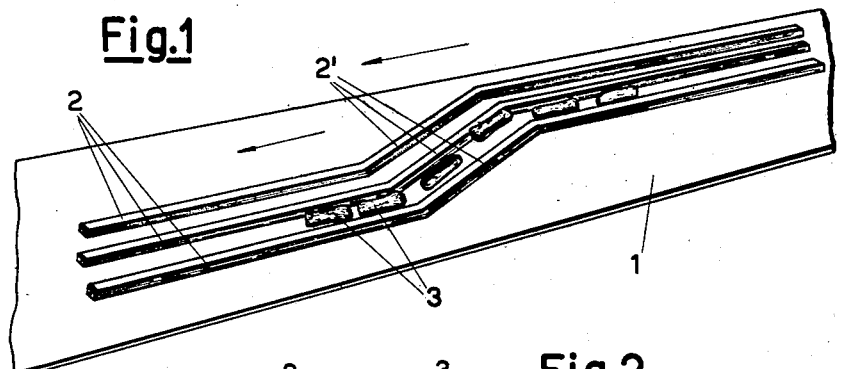
Fig. 1 represents in perspective view a portion of a transporting plane with the device for placing the biscuits all resting on analogous (on their flat) faces.
Figure 2:
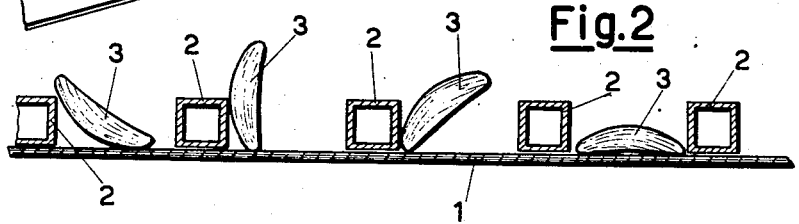
Fig. 2 represents in larger scale a cross-section at an intermediate point of said transporting plane and of said device.
Figure 3:
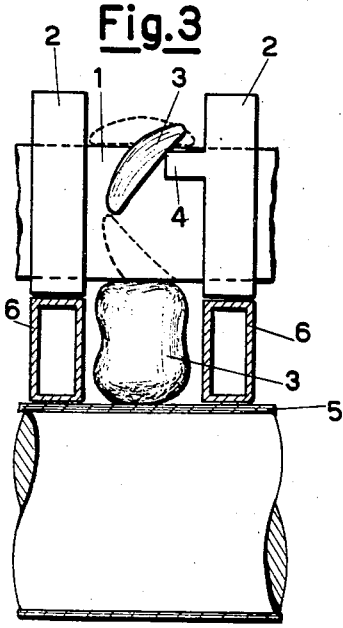
Fig. 3 represents a view and front section of the part of device for tilting the biscuits from the flat resting face.
Figure 4:
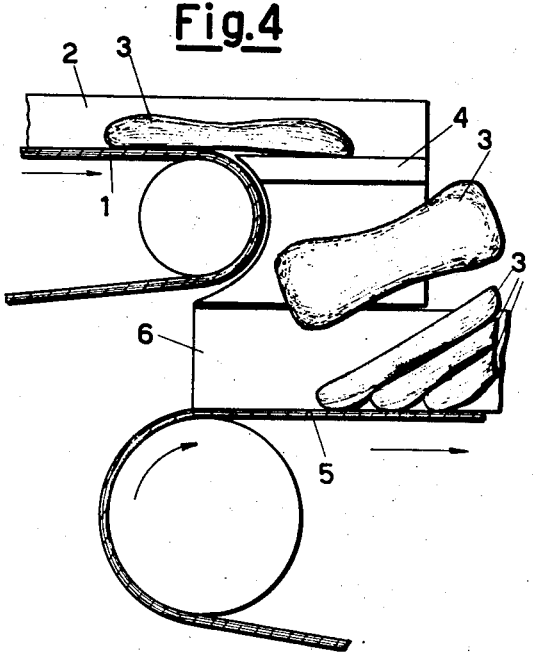
Fig. 4 represents a longitudinal section of the part of device represented in Figure 3 and Figs. 5, 6 and 7 represent respectively a cross-section in elevation, a plan view and a longitudinal section of a portion of conveyor after the tilting device represented in Figures 3 and 4.

Said guides 2 change direction at least at one point of their length (portion 2' visible in Figure 1) in such a way that the biscuits 3 placed flat abut against said portion 2' of the guides and follow the direction with their resting position while the biscuits arranged in opposite position, that is, lying on their convex faces, are compelled to erect and to turn over laterally so as to lie flat; in the accompanying Figure 2 there are represented some stages of this overturning from the position in which the biscuits lie on their convex sides to the position in which they lie on their flat sides.

At the end of the conveyor belt 1 and nearly at the same height of said belt, the guides 2 are provided each with a lateral projection 4 constituting a partial bottom onto which, at the end of the conveyor belt and by the latter the biscuits 3 conveyed lying flat are pushed.

The biscuits so arranged when arrived on the partial plane formed by the lateral projection 4 and after having left the belt 1, fall laterally and by effect of their own weight they are made to rotate by at least little more than 90° with respect to the vertical and are collected by a lower transporting belt 5 at convenient height and with equal direction of feed with respect to the upper one 1.

Almost adherent above this conveyor belt 5 in alignment and in the same vertical plane with the guides 2 there are provided fixed guides 6 between which the biscuits 3 come to be placed by effect of the rotation imparted by the aforesaid falling in tilted position with respect to the previous (flat) resting position. (See Figures 4, 5, 6, 7.) By means of a convenient vibrating device, the guides 6 are made to vibrate conveniently to permit the biscuits already placed and lying in one single sense as said above, to align perfectly.

This position and arrangement of the biscuits permits easy gripping thereof for placing into cases for sale.

I claim:

1. A device for placing biscuits having nearly elongated shape with substantially flat and respectively convex opposite faces resting with analogous (flat) faces on a conveyor belt that conveys them and for overturning them subsequently with respect to the previous position, characterized in that it comprises essentially a plurality of guides supported fixedly nearly adherent above and in the feed direction of the conveyor plane between which guides the biscuits are brought by said plane, in random position and deflected in direction at least at one point of their length in such a way that the biscuits lying flat abut thereagainst to follow their direction as they lie, while the biscuits lying on the opposite faces that is, lying on their convex faces, are compelled to jump and to overturn laterally so as to become lying flat; said guides being provided, at the end of the transporting plane, almost at the same height of said plane, with a lateral projection constituting a partial bottom onto which the biscuits are pushed by said transporting plane, and when leaving said transporting plane fall laterally and by effect of their own weight are rotated by at least little more than 90° with respect to the vertical and collected by a lower transporting plane at convenient height and with equal sense of feed with respect to the upper plane, onto which they come to lie overturned with respect to their previous (flat) lying position.

2. A device according to claim 1, characterized by a plurality of guides supported fixed almost adherent above the transporting plane at lower height, each of which is in alignment and in the same vertical plane with those of the upper transporting plane.

3. A device according to claim 2, characterized in that said guides of the lower transporting plane are made to vibrate.

References Cited in the file of this patent

UNITED STATES PATENTS

| | | |
|---|---|---|
| 420,743 | Smith | Feb. 4, 1890 |
| 876,291 | Blakeslee | Jan. 7, 1908 |
| 1,702,901 | Hungerford | Feb. 19, 1929 |
| 2,596,228 | Fletcher | May 13, 1952 |